US012077003B2

(12) United States Patent
Yu

(10) Patent No.: US 12,077,003 B2
(45) Date of Patent: Sep. 3, 2024

(54) THERMAL TRANSFER PRINTING APPARATUS, PRINTED ARTICLE PRODUCING METHOD, AND INTERMEDIATE TRANSFER MEDIUM

(71) Applicant: Dai Nippon Printing Co., Ltd., Tokyo (JP)

(72) Inventor: Yue Yu, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 194 days.

(21) Appl. No.: 17/753,095

(22) PCT Filed: Sep. 13, 2019

(86) PCT No.: PCT/JP2019/036120

§ 371 (c)(1),
(2) Date: Feb. 18, 2022

(87) PCT Pub. No.: WO2021/049009

PCT Pub. Date: Mar. 18, 2021

(65) Prior Publication Data

US 2022/0332127 A1 Oct. 20, 2022

(51) Int. Cl.
*B41J 2/325* (2006.01)

(52) U.S. Cl.
CPC .................................... *B41J 2/325* (2013.01)

(58) Field of Classification Search
CPC ... B41J 2/325; B41J 2/32; B41M 5/40; B41M 7/0027; B41M 2205/10
See application file for complete search history.

(56) References Cited

U.S. PATENT DOCUMENTS 6,019,527 A 2/2000 Green
6,377,291 B2 * 4/2002 Andoh .................. B41J 2/0057 347/213

FOREIGN PATENT DOCUMENTS

JP S60-253566 A 12/1985
JP S62-012268 A 1/1987
(Continued)

OTHER PUBLICATIONS

International Search Report and Written Opinion (Application No. PCT/JP2019/036120) dated Nov. 26, 2019.
(Continued)

*Primary Examiner* — Lisa Solomon
(74) *Attorney, Agent, or Firm* — BURR PATENT LAW, PLLC

(57) ABSTRACT

A thermal transfer printing apparatus includes a first supply unit (70) supplying an intermediate transfer medium (10) including a receiving layer disposed on one surface of a support member, a second supply unit (51) supplying a thermal transfer sheet (20) including a colorant layer disposed on one surface of a substrate, a printing unit (50) heating the thermal transfer sheet (20) based on image data and printing an image by transferring ink from the colorant layer to the receiving layer, and a transfer unit (60) transferring, onto a transfer-receiving body (40), at least part of the intermediate transfer medium (19) including the receiving layer having the image printed thereon. The printing unit (50) prints an image in each corresponding one of a plurality of sub-regions into which the intermediate transfer medium (10) is divided in a transverse direction.

10 Claims, 4 Drawing Sheets

(56) References Cited

FOREIGN PATENT DOCUMENTS

| | | | | |
|---|---|---|---|---|
| JP | S63-045065 | A | | 2/1988 |
| JP | 2002-059668 | A | | 2/2002 |
| JP | 2008-188865 | A | | 8/2008 |
| JP | 2009083139 | A | * | 4/2009 |
| JP | 2017-071065 | A | | 4/2017 |
| JP | 2017-154435 | A | | 9/2017 |
| JP | 2019-188730 | A | | 10/2019 |

OTHER PUBLICATIONS

Japanese Office Action (Application No. 2018-085486) dated Jan. 18, 2022 (with English translation).
Chinese Office Action (Application No. 201980099334.X) dated Dec. 30, 2022.
Korean Office Action (with English translation) dated Nov. 20, 2023 (Application No. 10-2022-7007585).
Extended European Search Report (Application No. 19944900.0) dated Apr. 18, 2023.

* cited by examiner

THERMAL TRANSFER PRINTING APPARATUS, PRINTED ARTICLE PRODUCING METHOD, AND INTERMEDIATE TRANSFER MEDIUM

TECHNICAL FIELD

The present invention relates to a thermal transfer printing apparatus, a printed article producing method, and an intermediate transfer medium.

BACKGROUND ART

A thermal transfer printer has been proposed as a printer that forms a thermally transferred image on any object. By using an intermediate transfer medium including a receiving layer separably disposed on a substrate and a thermal transfer sheet including a colorant layer, the thermal transfer printer transfers ink from the thermal transfer sheet to the receiving layer of the intermediate transfer medium to form an image, and then transfers a transfer layer including the receiving layer having the image formed thereon from the intermediate transfer medium onto a transfer-receiving body.

In conventional thermal transfer printers, the size of an image formed on a transfer-receiving body has been limited due to various factors. For example, the size of one side of an image has been limited by the width of heating elements of a thermal head for heating a thermal transfer sheet. The size of one side of an image has also been limited by the width of the thermal transfer sheet. An increased width of the heating elements of the thermal head means an increased weight of the apparatus and increased energy consumption. An increased width of the thermal transfer sheet means an increased area unused when forming a small image and thus means increased costs.

Intermediate transfer media often have detection marks for position detection arranged at predetermined intervals on the surface (transfer surface) thereof. By heating the detection mark portions, the detection marks are transferred to a transfer-receiving body. Therefore, the maximum size of one side of an image formed on the transfer-receiving body has been limited to the distance between adjacent ones of the detection marks.

Patent Literature 1: JP2008-188865A

SUMMARY OF INVENTION

The present invention aims to provide a thermal transfer printing apparatus and a printed article producing method that are capable of forming an image of any size onto a transfer-receiving body regardless of the size of, for example, a thermal transfer sheet or a thermal head. The present invention also aims to provide an intermediate transfer medium used in the thermal transfer printing apparatus.

According to the present invention, a thermal transfer printing apparatus includes a first supply unit supplying an intermediate transfer medium including a receiving layer disposed on one surface of a support member, a second supply unit supplying a thermal transfer sheet including a colorant layer disposed on one surface of a substrate, a printing unit heating the thermal transfer sheet based on image data and printing an image by transferring ink from the colorant layer to the receiving layer, and a transfer unit transferring, onto a transfer-receiving body, at least part of the intermediate transfer medium including the receiving layer having the image printed thereon. The printing unit prints an image in each corresponding one of a plurality of sub-regions into which the intermediate transfer medium is divided in a transverse direction.

According to one aspect of the present invention, the image printed in the sub-region is one of sub-images into which one image is divided.

According to one aspect of the present invention, the printing unit is movable along the transverse direction of the intermediate transfer medium.

According to one aspect of the present invention, the printing unit prints an image in each corresponding one of a plurality of sub-regions into which the intermediate transfer medium is divided in a longitudinal direction.

According to one aspect of the present invention, the intermediate transfer medium has detection marks for detecting positions of a plurality of sub-regions into which the intermediate transfer medium is divided in the transverse direction and a longitudinal direction.

According to one aspect of the present invention, the detection marks are dot-like marks formed at predetermined intervals in the transverse direction and the longitudinal direction of the intermediate transfer medium.

According to one aspect of the present invention, the detection marks include a plurality of first detection marks extending in the transverse direction and a plurality of second detection marks extending in the longitudinal direction, and regions surrounded by the first detection marks and the second detection marks are the sub-regions.

According to one aspect of the present invention, the intermediate transfer medium includes a transfer layer disposed in such a manner as to be peelable from the support member, and the transfer layer includes the receiving layer, the transfer unit transfers the transfer layer to the transfer-receiving body, and the detection marks are not transferred to the transfer-receiving body.

According to one aspect of the present invention, the transfer unit places and secures the intermediate transfer medium onto the transfer-receiving body, and the transfer unit includes a cutter cutting the intermediate transfer medium along an edge of the transfer-receiving body.

According to the present invention, a printed article producing method includes supplying an intermediate transfer medium including a receiving layer disposed on one surface of a support member, supplying a thermal transfer sheet including a colorant layer disposed on one surface of a substrate, printing an image by heating the thermal transfer sheet based on image data and transferring ink from the colorant layer to the receiving layer, and producing a printed article by transferring, onto a transfer-receiving body, at least part of the intermediate transfer medium including the receiving layer having the image printed thereon. An image is printed in each corresponding one of a plurality of sub-regions into which the intermediate transfer medium is divided in a transverse direction.

According to the present invention, an intermediate transfer medium includes a receiving layer disposed on one surface of a support member. The support member has detection marks for detecting positions of a plurality of sub-regions into which the intermediate transfer medium is divided in a transverse direction and a longitudinal direction, the detection marks include a plurality of first detection marks extending in the transverse direction and a plurality of second detection marks extending in the longitudinal direction, and at least one layer of the support member is peelable, the at least one layer including the detection marks.

According to the present invention, an intermediate transfer medium includes a receiving layer disposed on one surface of a support member. The support member has detection marks for detecting positions of a plurality of sub-regions into which the intermediate transfer medium is divided in a transverse direction and a longitudinal direction, the detection marks are dot-like marks formed at predetermined intervals in the transverse direction and the longitudinal direction of the intermediate transfer medium, and at least one layer of the support member is peelable, the at least one layer including the detection marks.

Advantageous Effects of Invention

The present invention makes it possible to form an image of any size onto a transfer-receiving body regardless of the size of, for example, a thermal transfer sheet or a thermal head.

DESCRIPTION OF EMBODIMENTS

Embodiments of the present invention will now be described on the basis of the drawings.

Figure 1:
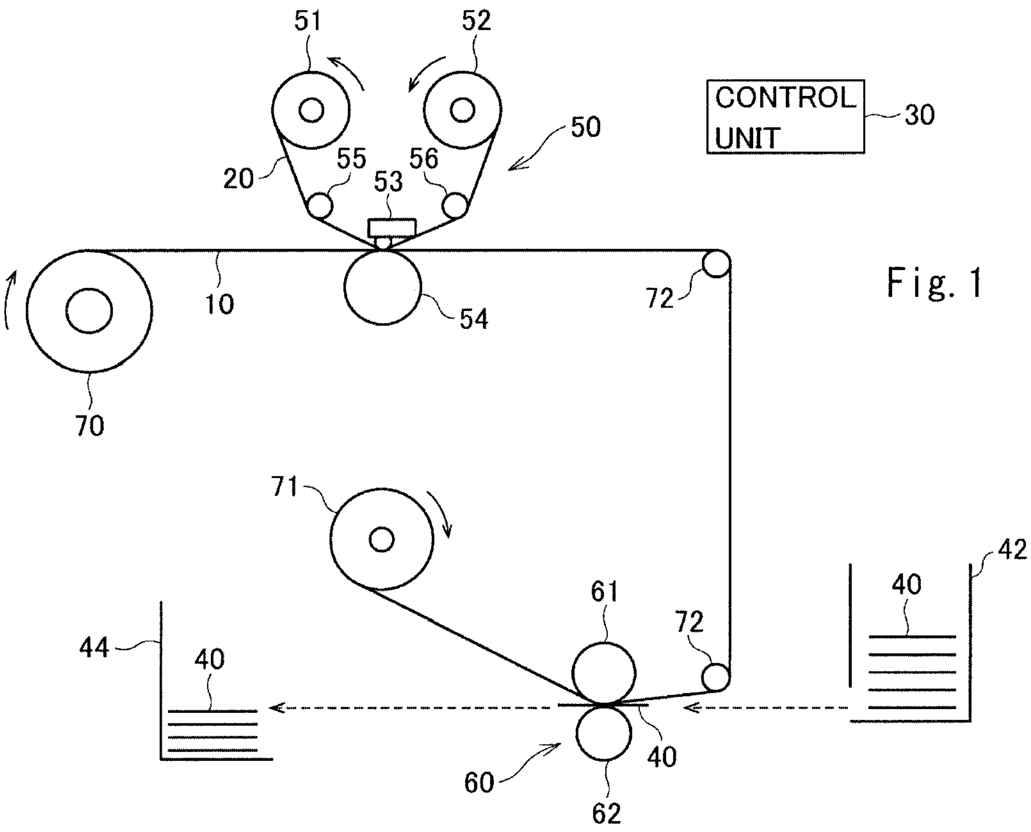
FIG. 1 is a diagram schematically illustrating a configuration of a thermal transfer printing apparatus according to an embodiment of the present invention.

FIG. 1 is a diagram schematically illustrating a configuration of a thermal transfer printing apparatus according to an embodiment of the present invention. As illustrated in FIG. 1, the thermal transfer printing apparatus includes a printing unit 50 configured to print an image on a receiving layer 13 (see FIG. 3) of an intermediate transfer medium 10 by using a thermal transfer sheet 20, a transfer unit 60 configured to transfer a transfer layer 14 (see FIG. 3) of the intermediate transfer medium 10 onto a transfer-receiving body 40, and a control unit 30 configured to control the operation of each unit. In the present embodiment, an image is formed on the transfer-receiving body 40 greater in width than the thermal transfer sheet 20 by using the intermediate transfer medium 10 greater in width than the thermal transfer sheet 20.

Figure 2:
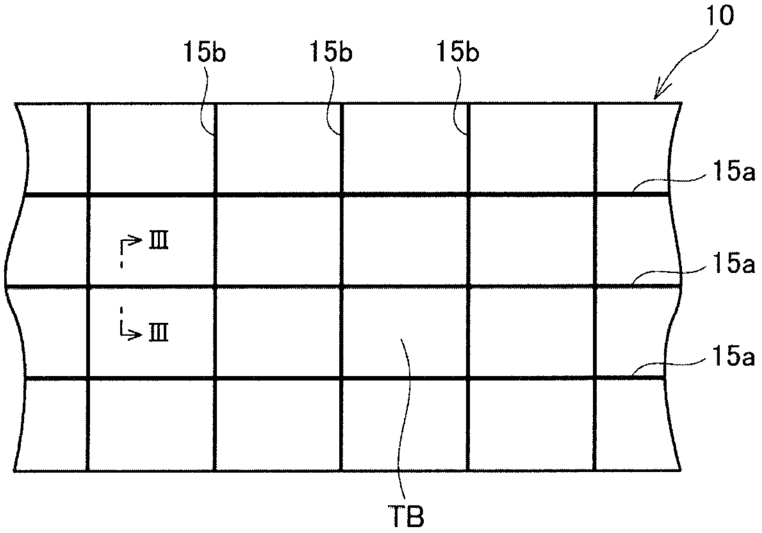
FIG. 2 is a plan view of an intermediate transfer medium.
Figure 3:
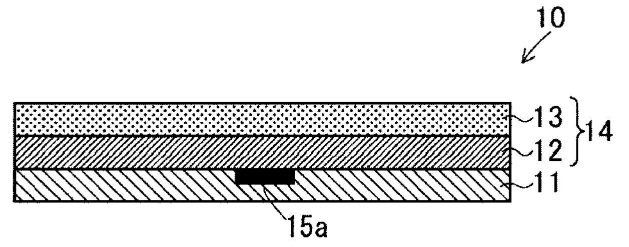
FIG. 3 is a cross-sectional view taken along line in FIG. 2.

FIG. 2 is a plan view of the intermediate transfer medium 10, and FIG. 3 is a cross-sectional view taken along line in FIG. 2. The intermediate transfer medium 10 includes a support member 11 and a transfer layer 14 disposed on one surface of the support member 11. The transfer layer 14 has a layered structure including a peeling layer 12 disposed on the support member 11 and a receiving layer 13 disposed on the peeling layer 12. The receiving layer 13 is an outermost layer of the intermediate transfer medium 10 and farthest of all layers forming the transfer layer 14 from the support member 11. An image is printed by thermally transferring ink to the receiving layer 13. After image printing, a region of the transfer layer 14 including the image is transferred onto the transfer-receiving body 40.

The intermediate transfer medium 10 has a plurality of detection marks 15*a* and a plurality of detection marks 15*b* formed at predetermined intervals. The detection marks 15*a* extend in a longitudinal direction of the intermediate transfer medium 10, and the detection marks 15*b* extend in a width direction (short-side or transverse direction) of the intermediate transfer medium 10. The detection marks 15*a* and the detection marks 15*b* are orthogonal to each other. Each of regions surrounded by the detection marks 15*a* and 15*b* constitutes a transfer block TB (described below).

The detection marks 15*a* and 15*b* are formed outside the transfer layer 14 so as not to be transferred to the transfer-receiving body 40. For example, the detection marks 15*a* and 15*b* are formed in the support member 11 or on the support member 11, in a release layer provided as an optional component between the support member 11 and the transfer layer 14, or on the surface of the support member 11 distant from the transfer layer 14.

Figure 4:
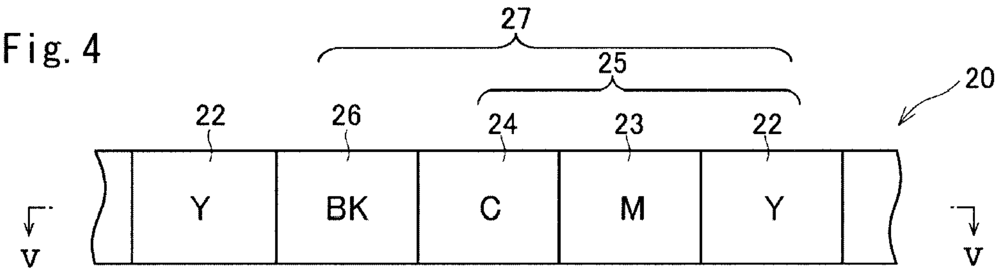
FIG. 4 is a plan view of a thermal transfer sheet.
Figure 5:
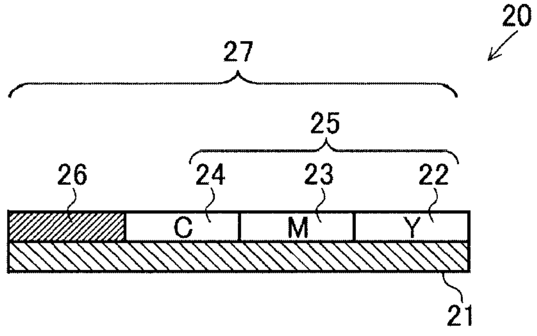
FIG. 5 is a cross-sectional view taken along line V-V in FIG. 4.

FIG. 4 is a plan view of the thermal transfer sheet 20 and FIG. 5 is a cross-sectional view taken along line V-V in FIG. 4. As illustrated in FIG. 4 and FIG. 5, the thermal transfer sheet 20 includes a substrate 21, a dye layer 25 including a yellow (Y) layer 22, a magenta (M) layer 23, and a cyan (C) layer 24, and a melt layer 26 of black (BK) that are disposed on the same surface of the substrate 21. Colorant layers 27, each including the dye layer 25 and the melt layer 26, are arranged in a repeated manner. The melt layer 26 may be disposed at least in front of, or behind, the set of Y layer 22, M layer 23, and C layer 24. The melt layer 26 may be a feature layer of metallic color or fluorescent color.

The substrate 21 is not limited to a particular one. For example, a stretched or unstretched plastic film may be used as the substrate 21.

The dye layer 25 contains dyes and a binder resin for carrying the dyes. Any dyes and binder resin known in the field of sublimation thermal transfer may be appropriately selected and used.

The melt layer 26 may be any layer capable of being thermally melted, softened, and transferred onto the transfer layer 14. For example, the melt layer 26 contains a hot-melt ink and a binder resin. The melt layer 26 is optional.

The configuration of the thermal transfer sheet 20 is not limited to that illustrated in FIG. 4 and FIG. 5. For example, a backside layer (not shown) may be added to the surface of the thermal transfer sheet 20 opposite the colorant layer.

As illustrated in FIG. 1, a supply unit 70 (first supply unit) of the thermal transfer printing apparatus is loaded with a reel with the intermediate transfer medium 10 wound up therearound like a ribbon. The supply unit 70 is configured to rotate the reel of the intermediate transfer medium 10 and convey the intermediate transfer medium 10 in the form of a long belt to the printing unit 50 and the transfer unit 60 in sequence.

The printing unit 50 includes a thermal head 53, a platen roll 54 disposed below the thermal head 53 and capable of being rotated and driven, and a raising and lowering unit (not shown) capable of raising and lowering the thermal head 53 with respect to the platen roll 54. The intermediate transfer medium 10 supplied by the supply unit 70 passes through the gap between the thermal head 53 and the platen roll 54.

The printing unit 50 is configured such that the thermal transfer sheet 20 from a supply roll 51 (second supply unit) passes by a guide roll 55 and then through the gap between the thermal head 53 and the platen roll 54, further passes by a guide roll 56, and is taken up by a take-up roll 52. In the gap between the thermal head 53 and the platen roll 54, the dye layer 25 and the melt layer 26 of the thermal transfer sheet 20 face the receiving layer 13 of the intermediate transfer medium 10.

The thermal head 53 is configured to heat the dye layer 25, with the substrate 21 of the thermal transfer sheet 20 therebetween, to transfer the dyes onto the receiving layer 13 of the intermediate transfer medium 10 to form an image. The thermal head 53 is also configured to heat the melt layer 26, with the substrate 21 of the thermal transfer sheet 20 therebetween, to transfer, for example, the hot-melt ink onto the receiving layer 13 of the intermediate transfer medium 10 to form an image (characters).

An image printing process first involves positioning the intermediate transfer medium 10 and the Y layer 22 of the thermal transfer sheet 20 and lowering the thermal head 53 toward the platen roll 54 to bring the thermal head 53 into contact with the platen roll 54, with the thermal transfer sheet 20 and the intermediate transfer medium 10 interposed therebetween. A take-up unit 71 for taking up the intermediate transfer medium 10 and the take-up roll 52 for taking up the thermal transfer sheet 20 are rotated and driven to advance the thermal transfer sheet 20 and the intermediate transfer medium 10. During this operation, on the basis of image data transmitted to the thermal head 53, the thermal head 53 selectively heats a region of the Y layer 22 of the thermal transfer sheet 20 to transfer the yellow dye from the thermal transfer sheet 20 to the receiving layer 13.

After the transfer of the yellow dye, the thermal head 53 is raised away from the platen roll 54. This is followed by positioning of the intermediate transfer medium 10 and the M layer 23 of the thermal transfer sheet 20. Then, in the same manner as transferring the yellow dye to the receiving layer 13, the M layer 23 and the C layer 24 are heated to transfer the magenta dye and the cyan dye sequentially to the receiving layer 13.

Then, the thermal head 53 is raised away from the platen roll 54. This is followed by positioning of the intermediate transfer medium 10 and the melt layer 26 of the thermal transfer sheet 20. The thermal head 53 is lowered toward the platen roll 54 and brought into contact with the platen roll 54, with the thermal transfer sheet 20 and the intermediate transfer medium 10 interposed therebetween. The take-up unit 71 for taking up the intermediate transfer medium 10 and the take-up roll 52 for taking up the thermal transfer sheet 20 are rotated and driven to advance the thermal transfer sheet 20 and the intermediate transfer medium 10. During this operation, based on image data transmitted to the thermal head 53, the thermal head 53 selectively heats a region of the melt layer 26 of the thermal transfer sheet 20, so that an image is printed on the intermediate transfer medium 10.

Figure 6:
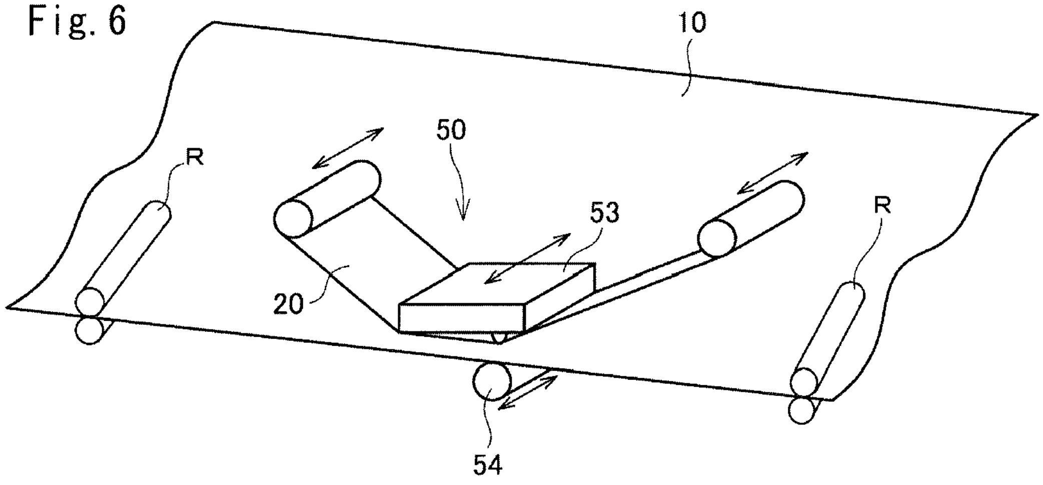
FIG. 6 is a diagram schematically illustrating a configuration of a printing unit.

In the present embodiment, the thermal transfer sheet 20 is sized to allow an image to be printed in one transfer block TB by a single printing process. As illustrated in FIG. 6, the printing unit 50 including the thermal head 53 and the platen roll 54 is movable in the width direction of the thermal transfer sheet 20 (intermediate transfer medium 10). The printing unit 50 is capable of positioning using the detection marks 15*a* and 15*b* and continuous image printing in adjacent transfer blocks TB. For example, the width of the intermediate transfer medium 10 is "n" times the width of the thermal transfer sheet 20 (colorant layer 25) (where "n" is an integer greater than or equal to 2). Conveying rollers R that convey the intermediate transfer medium 10 are configured to move as the printing unit 50 moves. The conveying rollers R preferably have substantially the same width as the thermal head 53. The conveying rollers R may be sized to have substantially the same width as the intermediate transfer medium 10 so that they do not need to be moved.

Figure 7A:
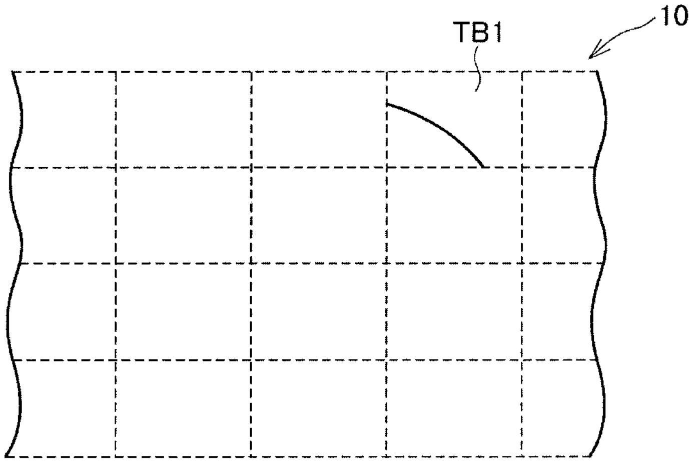
FIG. 7*a* to FIG. 7*c* are diagrams illustrating an image printing method.
Figure 7B:
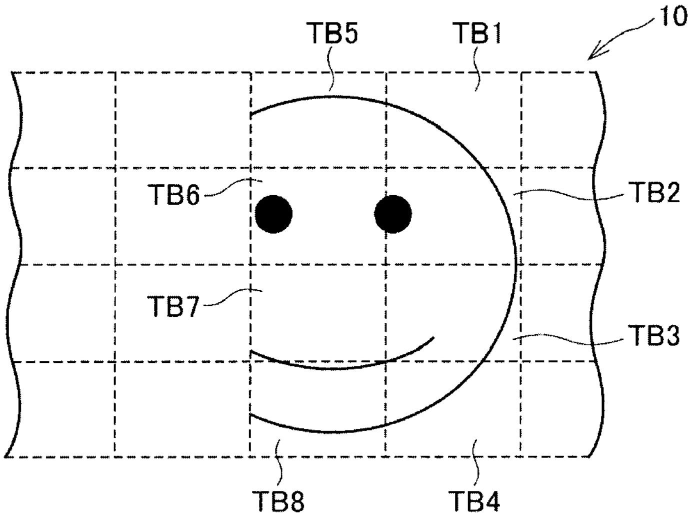
Figure 7C:
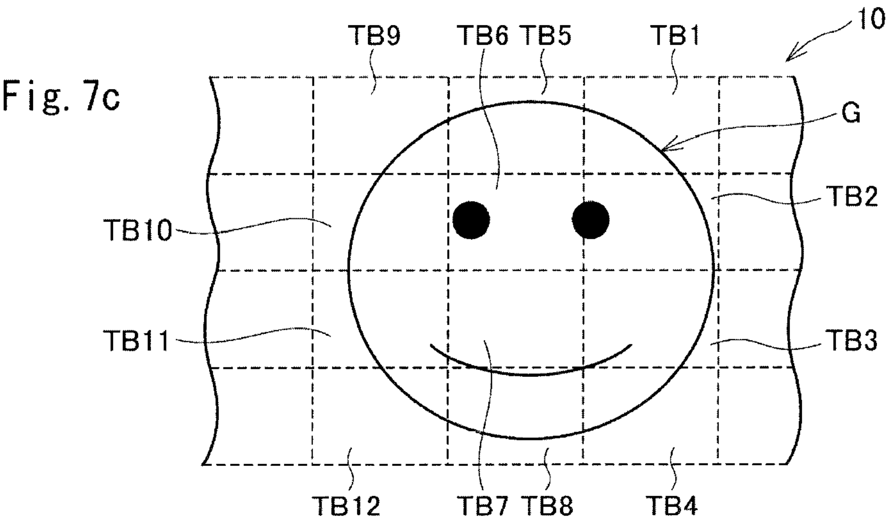

By combining the movement of the printing unit 50 with the conveyance of the intermediate transfer medium 10, sub-images obtained by dividing a large image are sequentially printed, as illustrated for example in FIG. 7*a* to FIG. 7*c*, in transfer blocks TB1, TB2, TB3, . . . , TB11, and TB12. The sub-images are also printed over the detection marks 15*a* and 15*b*. The sub-images printed in the transfer blocks TB are combined, so that an image G having a large size that cannot be printed by a single printing process is printed on the intermediate transfer medium 10. In the example illustrated in FIG. 7*a* to FIG. 7*c*, the width of the intermediate transfer medium 10 is about four times the width of the thermal transfer sheet 20 (colorant layer 25). Four transfer blocks are thus arranged in the width direction of the intermediate transfer medium 10.

For example, the control unit 30 divides the image G into a mesh of sub-images on the basis of the size of the transfer blocks TB and the number of the transfer blocks TB arranged, and sequentially transfers data of the sub-images to the thermal head 53 to control the printing process.

The control unit 30 preferably sets the print positions of the sub-images in the longitudinal direction of the intermediate transfer medium 10 in such a way as to reduce the number of transfer blocks TB in which the sub-images are to be printed (i.e., the number of transfer blocks TB to be used).

The intermediate transfer medium 10 having an image printed, in the printing unit 50, on the receiving layer 13 in a plurality of transfer blocks TB is conveyed via a guide roll 72 to the transfer unit 60.

The transfer unit 60 includes a heat roller 61 and a pressure roll 62 disposed below the heat roller 61. The transfer unit 60 is configured to transfer the transfer layer 14 of the intermediate transfer medium 10 to the transfer-receiving body 40 which is supplied from a transfer-receiving body supply unit 42 (third supply unit). The heat roller 61, the pressure roll 62, and the transfer-receiving body 40 are sized to correspond to the width of the intermediate transfer medium 10.

The transfer-receiving body supply unit 42 includes, for example, a feeder configured to feed sheet-like transfer-receiving bodies 40 one by one in accordance with conveyance of the intermediate transfer medium 10, and a conveyor configured to convey the fed transfer-receiving bodies 40.

The transfer-receiving body 40 is, for example, a card substrate containing, as a matrix material, a synthetic resin, such as polyvinyl chloride, polyester, polycarbonate, polyamide, polyimide, polycellulose diacetate, polycellulose triacetate, polystyrene, acrylic resin, polypropylene, or polyethylene.

In the gap between the heat roller 61 and the pressure roll 62, the transfer unit 60 heats the intermediate transfer medium 10, with the surface of the receiving layer 13 in a plurality of transfer blocks TB having an image printed thereon placed over the transfer-receiving body 40. This peels and transfers the transfer layer 14 from the support member 11 to the transfer-receiving body 40 and allows an image to be formed on the transfer-receiving body 40. The detection marks 15*a* and 15*b* are not transferred to the transfer-receiving body 40 and remain in the intermediate transfer medium 10. After the transfer of the transfer layer 14, the resulting intermediate transfer medium 10 is taken up and recovered by the take-up unit 71.

The present embodiment uses the thermal transfer sheet 20 and the thermal head 53 that are small in size (width), performs positioning on the basis of the detection marks 15*a* and 15*b* arranged in a grid, and prints an image in each corresponding one of a plurality of sub-regions (transfer blocks) into which the intermediate transfer medium 10 is divided. Sub-images into which a large image is divided are each printed in a corresponding one of the transfer blocks. Thus, a large size image that cannot be printed by a single printing process, which uses the thermal transfer sheet 20 and the thermal head 53 small in size, can be printed on the intermediate transfer medium 10. The large size image is transferred from the intermediate transfer medium 10 to the transfer-receiving body 40. The size of the image formed on the transfer-receiving body 40 can be easily changed by varying the number of transfer blocks used in image printing.

The present embodiment thus makes it possible to form an image of any size on the transfer-receiving body 40 regardless of the size of, for example, the thermal transfer sheet 20 or the thermal head 53.

In the embodiment described above, the printing unit 50 and the thermal transfer sheet 20 are movable with respect to the intermediate transfer medium 10. However, the intermediate transfer medium 10 may be moved, with the printing unit 50 and the thermal transfer sheet 20 secured in place.

Figure 8:
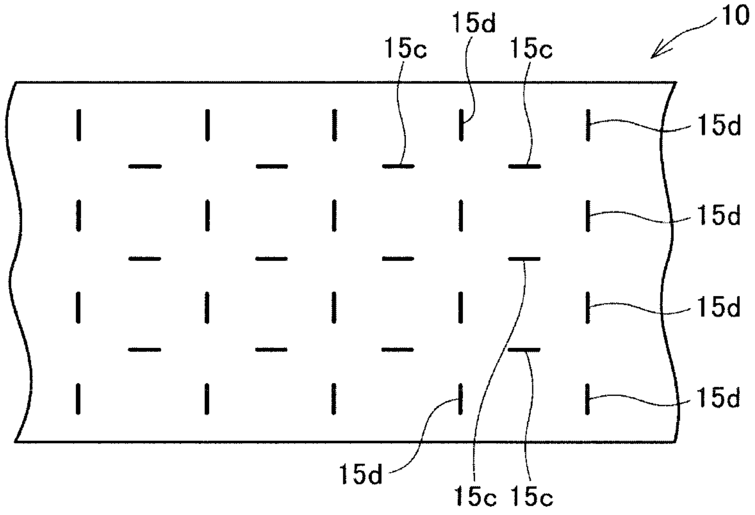
FIG. 8 is a plan view of a modified intermediate transfer medium.

In the embodiment described above, the intermediate transfer medium 10 has the detection marks 15*a* and 15*b* formed in a grid. However, the detection marks may have any form that allows detection of the position of each transfer block TB, and do not necessarily need to be formed in a grid. For example, as illustrated in FIG. 8, the intermediate transfer medium 10 may have a plurality of detection marks 15*c* and 15*d* formed at predetermined intervals in the longitudinal and transverse directions. The detection marks 15*c* and 15*d* can also indicate the positions of a plurality of transfer blocks into which the intermediate transfer medium 10 is divided (or sectioned) in the longitudinal and transverse directions.

The detection marks do not necessarily need to be linear marks, but may be dot-like marks. For example, the intermediate transfer medium 10 may have a plurality of dot-like detection marks formed at predetermined intervals in the longitudinal and transverse directions. For example, the dot-like detection marks each correspond to a vertex of the transfer block TB.

In the embodiment described above, the transfer layer 14 across the width of the intermediate transfer medium 10 is transferred to the transfer-receiving body 40. However, the transfer layer 14 in only some transfer blocks TB in the width direction of the intermediate transfer medium 10 may be transferred to the transfer-receiving body 40. In this case, for example, as illustrated in FIG. 9, only a part of the heat roller 61 having a width greater than or equal to the intermediate transfer medium 10 may be heated.

Figure 10:
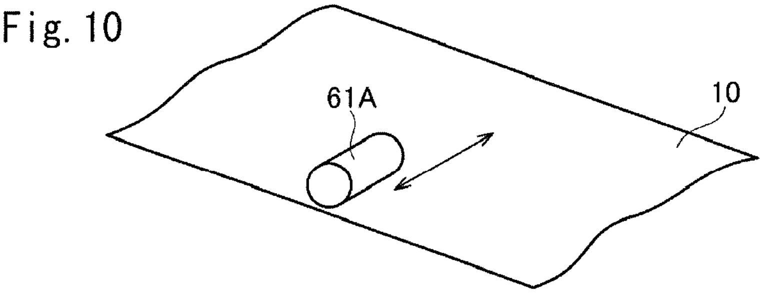
FIG. 10 is a diagram illustrating an example of a heating method using another heat roller.

Alternatively, as illustrated in FIG. 10, a necessary region of the intermediate transfer medium 10 may be heated while a small-sized heat roller 61A corresponding to the width of one transfer block TB is being moved, and the transfer layer 14 in one or more transfer blocks TB having an image printed therein may be transferred to the transfer-receiving body 40.

Figure 9:
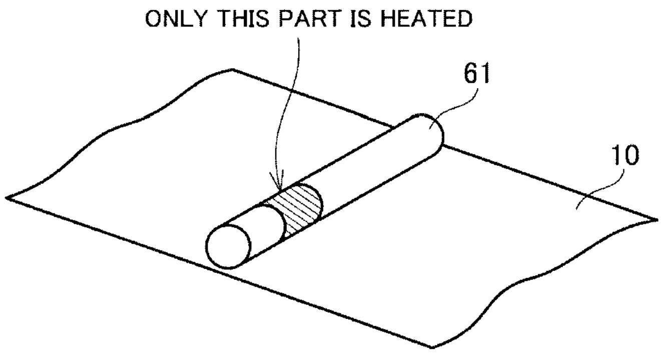
FIG. 9 is a diagram illustrating an example of a heating method using a heat roller.

In the examples illustrated in FIG. 9 and FIG. 10, the size (width) of the transfer-receiving body 40 may be smaller than the size (width) of the intermediate transfer medium 10.

As described above, the intermediate transfer medium 10 has a layered structure including the support member 11, the peeling layer 12, and the receiving layer 13. Examples of the material of the support member 11 include, but are not particularly limited to, highly heat resistant polyesters, such as polyethylene terephthalate and polyethylene naphthalate, and stretched or unstretched plastic films of polypropylene, polycarbonate, cellulose acetate, polyethylene derivatives, polyamide, and polymethylpentene. A composite film including layers of two or more of these materials may be used. The thickness of the support member 11 may be appropriately selected in accordance with the material in such a way as to ensure, for example, appropriate strength and heat resistance. Generally, the thickness of the support member 11 is greater than or equal to 3 μm and less than or equal to 30 μm, and preferably greater than or equal to 4 μm and less than or equal to 15 μm. When the support member 11 is a multilayer member, the plurality of layers may be peelable, but do not necessarily need to be peelable.

The material of the receiving layer 13 is not limited to a particular one. Any receiving layer known in the field of intermediate transfer media may be appropriately selected and used. Examples of the material include polyolefin such as polypropylene, halogenated resin such as polyvinyl chloride or polyvinylidene chloride, vinyl resin such as polyvinyl acetate, vinyl chloride-vinyl acetate copolymer, ethylene-vinylacetate copolymer, or polyacrylic acid ester, polyester such as polyethylene terephthalate or polybutylene terephthalate, a copolymer of olefin such as polystyrene, polyamide, ethylene, or propylene and other vinyl polymers, cellulosic resin such as ionomer or cellulose diastase, and solvent-based resins such as polycarbonate and acrylic resin. The receiving layer 13 may contain only one of these components, or may contain two or more of these components.

The receiving layer 13 may contain a release agent, as well as the resin components described above. Examples of the release agent include solid waxes such as polyethylene wax, amide wax, and Teflon (registered trademark) powder, fluorochemical or phosphoester surfactant, silicone oil, various modified silicone oils such as reactive silicone oil and curable silicone oil, and various silicone resins.

The thickness of the receiving layer 13 is not particularly limited, but is, for example, greater than or equal to 1 μm and less than or equal to 10 μm.

The peeling layer 12 is provided to facilitate transfer (or separation) of the transfer layer 14. Of the layers included in the transfer layer 14, the peeling layer 12 is disposed closest to the support member 11. Examples of components of the peeling layer 12 include wax materials, silicone wax, silicone resin, silicone modified resin, fluorocarbon polymer, fluorocarbon modified resin, polyvinyl alcohol, acrylic resin, thermal cross-linking epoxy-amino resin, and thermal cross-linking alkyd-amino resin. The peeling layer 12 may contain only one of these components, or may contain two or more of these components.

The thickness of the peeling layer 12 is not particularly limited, but is, for example, greater than or equal to 0.5 μm and less than or equal to 5 μm.

Examples of the material forming the detection marks 15*a* and 15*b* that are not transferred to the transfer-receiving body 40 include, but are not particularly limited to, carbon black, vinyl chloride-vinyl acetate copolymer, vinyl alcohol copolymer, and polyethylene wax.

The configuration of the intermediate transfer medium 10 is not limited to that illustrated in FIG. 3. For example, the peeling layer 12 and the receiving layer 13 may be provided with another layer, such as a protective layer (not shown), therebetween. The transfer layer 14 may include a protective layer disposed on the support member 11 and the receiving layer 13 disposed on the protective layer. The support member 11 and the transfer layer 14 may be provided with another layer therebetween. The support member 11 may have a backside layer (not shown) on the other surface thereof.

In the embodiment described above, the transfer layer is transferred to the transfer-receiving body by applying heat and pressure to the intermediate transfer medium. However, the process of applying heat to the intermediate transfer medium may be omitted. That is, the transfer layer may be transferred by applying pressure to the intermediate transfer medium to press the transfer layer against the transfer-receiving body.

The intermediate transfer medium is not limited to one in which the transfer layer including the receiving layer is separated from the support member and transferred to the transfer-receiving body. For example, the entire intermediate transfer medium including the support member may be placed over, and secured to, the transfer-receiving body and then cut, for example, with a cutter along the edge of the transfer-receiving body. In this case, the support member is formed by a plurality of peelable layers and a layer with the detection marks is separated off. The separation of the layer with the detection marks may take place before transfer to the transfer-receiving body, may take place after transfer and before cutting, or may take place after cutting. The transfer of the intermediate transfer medium may involve bonding the intermediate transfer medium to the transfer-receiving body, with an adhesive layer therebetween.

If the support member of the intermediate transfer medium includes a plurality of peelable layers, forming an image on the receiving layer may be followed by separating a layer (release paper) of the support member, which is further followed by transferring the transfer layer to the transfer-receiving body. When the transfer layer is transferred to the transfer-receiving body, the remaining part of the support member may be separated, or part of the support member not including the detection marks may be left unseparated.

In the embodiment described above, the image G is divided in the width and longitudinal directions of the intermediate transfer medium 10 into a plurality of sub-images, each of which is printed in a corresponding one of the transfer blocks TB. Alternatively, the image G may be divided only in the width direction into sub-images, each of which is printed at a time in the longitudinal direction. That is, the image G is divided into a plurality of strip-shaped sub-images extending in the longitudinal direction of the intermediate transfer medium 10. The strip-shaped sub-images are each assigned to a plurality of transfer blocks TB adjacent in the longitudinal direction. The detection marks 15*a* and 15*b* are used in positioning at intervals of more than one mark, in accordance with the image size.

Although the present invention has been described in detail by way of the specific modes, it is apparent for those skilled in the art that various changes can be made without departing from the spirit and scope of the present invention.

The present application is based on Japanese Patent Application No. 2018-085486 filed on Apr. 26, 2018, the entire contents of which are incorporated herein by reference.

REFERENCE SIGNS LIST

10: intermediate transfer medium
11: support member
12: peeling layer
13: receiving layer
14: transfer layer
15*a*, 15*b*, 15*c*, 15*d*: detection mark
20: thermal transfer sheet
21: substrate
22: yellow layer
23: magenta layer
24: cyan layer
25: dye layer
26: melt layer
27: colorant layer
30: control unit
40: transfer-receiving body
50: printing unit
60: transfer unit

The invention claimed is:

1. A thermal transfer printing apparatus comprising:

a first supply unit supplying an intermediate transfer medium including a receiving layer disposed on one surface of a support member;

a second supply unit supplying a thermal transfer sheet including a colorant layer disposed on one surface of a substrate;

a printing unit heating the thermal transfer sheet based on image data and printing an image by transferring ink from the colorant layer to the receiving layer; and a transfer unit transferring, onto a transfer-receiving body, at least part of the intermediate transfer medium including the receiving layer having the image printed thereon, wherein the printing unit prints an image in each corresponding one of a plurality of sub-regions into which the intermediate transfer medium is divided in a transverse direction, and wherein the transfer unit transfers the entire receiving layer, in the transverse direction of the intermediate transfer medium, to the transfer-receiving body.

2. The thermal transfer printing apparatus according to claim 1, wherein the image printed in the sub-region is one of sub-images into which one image is divided.

3. The thermal transfer printing apparatus according to claim 1, wherein the printing unit is movable along the transverse direction of the intermediate transfer medium.

4. The thermal transfer printing apparatus according to claim 1, wherein the printing unit prints an image in each corresponding one of a plurality of sub-regions into which the intermediate transfer medium is divided in a longitudinal direction.

5. The thermal transfer printing apparatus according to claim 1, wherein the intermediate transfer medium has detection marks for detecting positions of a plurality of sub-regions into which the intermediate transfer medium is divided in the transverse direction and a longitudinal direction.

6. The thermal transfer printing apparatus according to claim 5, wherein the detection marks are dot-like marks formed at predetermined intervals in the transverse direction and the longitudinal direction of the intermediate transfer medium.

7. The thermal transfer printing apparatus according to claim 5, wherein the detection marks include a plurality of first detection marks extending in the transverse direction and a plurality of second detection marks extending in the longitudinal direction; and wherein regions surrounded by the first detection marks and the second detection marks are the sub-regions.

8. The thermal transfer printing apparatus according to claim 5, wherein the intermediate transfer medium includes a transfer layer disposed in such a manner as to be peelable from the support member, and the transfer layer includes the receiving layer;

wherein the transfer unit transfers the transfer layer to the transfer-receiving body; and wherein the detection marks are not transferred to the transfer-receiving body.

9. The thermal transfer printing apparatus according to claim 1, wherein the transfer unit places and secures the intermediate transfer medium onto the transfer-receiving body; and wherein the transfer unit includes a cutter cutting the intermediate transfer medium along an edge of the transfer-receiving body.

10. A printed article producing method comprising the steps of:

supplying an intermediate transfer medium including a receiving layer disposed on one surface of a support member;

supplying a thermal transfer sheet including a colorant layer disposed on one surface of a substrate;

printing an image by heating the thermal transfer sheet based on image data and transferring ink from the colorant layer to the receiving layer; and producing a printed article by transferring, onto a transfer-receiving body, at least part of the intermediate transfer medium including the receiving layer having the image printed thereon, wherein an image is printed in each corresponding one of a plurality of sub-regions into which the intermediate transfer medium is divided in a transverse direction, and wherein the entire receiving layer, in the transverse direction of the intermediate transfer medium, is transferred to the transfer-receiving body.

* * * * *